US007694290B2

(12) United States Patent
Liu et al.

(10) Patent No.: US 7,694,290 B2
(45) Date of Patent: Apr. 6, 2010

(54) SYSTEM AND METHOD FOR PARTITIONING AN APPLICATION UTILIZING A THROUGHPUT-DRIVEN AGGREGATION AND MAPPING APPROACH

(75) Inventors: Lixia Liu, Beijing (CN); Dz-ching (Roy) Ju, Saratoga, CA (US); Michael K. Chen, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1252 days.

(21) Appl. No.: 11/219,089

(22) Filed: Sep. 1, 2005

(65) Prior Publication Data

US 2007/0061286 A1 Mar. 15, 2007

(51) Int. Cl.
*G06F 9/45* (2006.01)
(52) U.S. Cl. ............... 717/151; 717/154; 718/102; 718/105
(58) Field of Classification Search .......... 717/151; 718/102
See application file for complete search history.

(56) References Cited

U.S. PATENT DOCUMENTS

2004/0111715 A1* 6/2004 Stone .................. 717/148

OTHER PUBLICATIONS

A Programming Environment for Packet-processing Systems: Design Considerations Harrick M. Vin, Jayaram Mudigonda, Jamie Jason, Erik J. Johnson, Roy Ju, Aaron Kunze, and Ruiqi Lian. In the Workshop on Network Processors & Applications Feb. 14-18, 2004.*
Optimal mapping of sequences of data parallel tasks by Jaspal Subhlok Gary Vondran Principles and Practice of Parallel Programming Proceedings of the fifth ACM SIGPLAN symposium on Principles and practice of parallel programming pp. 134-143 Year of Publication: 1995.*
Harrick Vin et al., *A Programming Environment for Packet-Processing Systems: Design Considerations*, http://www.cs.utexas.edu/users/vin/pub/pdf/vin04programming.pdf., Printed Feb. 2004, 15 pages.

* cited by examiner

*Primary Examiner*—Lewis A Bullock, Jr.
*Assistant Examiner*—Paul Mills
(74) *Attorney, Agent, or Firm*—Blakely, Sokoloff, Taylor & Zafman LLP

(57) ABSTRACT

A method and system to optimize throughput of executable program code are provided. The system comprises a profiler to receive a representation of a plurality of functions, an aggregator, and a mapper to map the plurality of aggregates to a plurality of processors. The aggregator may be configured to create an aggregate for each function from the plurality of functions thereby creating a plurality of aggregates, choose an optimization action between grouping and duplication based on the number of aggregates in the plurality of aggregates, the number of available processing elements (PEs), and execution time of each aggregate, and perform the chosen optimization action.

19 Claims, 6 Drawing Sheets

SYSTEM AND METHOD FOR PARTITIONING AN APPLICATION UTILIZING A THROUGHPUT-DRIVEN AGGREGATION AND MAPPING APPROACH

BACKGROUND

1. Technical Field

One or more embodiments of the invention generally relate to programming of chip multiprocessors. In particular, certain embodiments relate to partitioning an application utilizing a throughput-driven aggregation and mapping approach.

2. Description of Related Art

Chip multiprocessors (CMPs) integrate multiple processors onto one chip. Compared to traditional multiprocessors, CMPs make possible for parallel applications to achieve high performance with lower system cost. Although many CMPs are based on homogeneous architectures, some CMPs (e.g., network processors) are based on a heterogeneous architecture, which composes both general purpose processors and specialized processing elements (PEs). For example, a network processor may include one general purpose processor and multiple processing elements. The general purpose processor may be used to initialize and manage the whole chip, as well as handle control-plane tasks. The PEs, on the other hand, may be configured to handle high rate data-plane processing of packets crucial to the performance of the whole system. The PEs may also support multiple hardware threads to better exploit thread-level parallelism. The PEs may have hardware constraints due to a limited code space on each PE.

In order to achieve high performance of applications running on complex heterogeneous CMPs, developers may have to manually partition an application into tasks and map the tasks to specific processors. The process of manually partitioning an application into tasks and mapping these tasks to appropriate processors on the chip is often time consuming. Such hand-tuned partitioning and mapping decisions are usually made at design time and are based on the performance expectations of the application, the expected workload, and the exact hardware configuration of the system. Consequently, when an application is ported from one platform to another, the performance rarely scales as expected due to mismatches between the mappings, workloads, and the new hardware.

BRIEF DESCRIPTION OF THE DRAWINGS

The embodiments of the invention are illustrated by way of example and not limited by the accompanying drawings, in which like references indicate similar elements and in which.

DETAILED DESCRIPTION

In one embodiment, the invention may be implemented in an exemplary compiler, where an executable program code (e.g., an application, an operating system, or a routine within an application) may be partitioned into a series of tasks (called aggregates), which form the processing stages in a pipeline. On a network processor running a packet-processing application, for example, these pipeline stages can be mapped to multiple PEs as well as to the general purpose processor. The packet-processing functions of the applications may be grouped into aggregates such that these aggregates, when mapped onto the multiple processor cores, can maximize the overall throughput. When the compiler derives aggregates, a throughput-based cost model may be utilized to guide each aggregation step. The cost model, in one embodiment, may include factors such as cost of communication, synchronization cost, memory access latency, CPU execution time, and code size.

In one embodiment, the new approach for automatic partitioning of applications is driven by functional aggregation that simultaneously considers grouping and duplication of critical functions. Utilizing such an approach may ease programming of CMPs and improve parallelization on CMPs. In one embodiment, a method to generate code partitions on CMPs includes first generating an aggregate for each function in the application and then selecting an optimization action such as grouping of aggregates or duplication of aggregates. The choice of a particular optimization action may be based on the execution time of each aggregate and on the usage of hardware resources. The selected optimization action may then be applied to the aggregates recursively until the desired optimization is achieved.

Grouping and duplication of aggregates may greatly reduce communication cost, which, for some applications, is a considerable obstacle in achieving high throughput. In one embodiment, in addition to aggregating functions, a compiler may also support function splitting to reduce the granularity of large, decomposable functions. Automatic partitioning and mapping may allow a developer to program a heterogeneous CMP as easily as a traditional uniprocessor and still achieve throughput performance comparable to that of manually partitioned applications. It will be noted that the present method, in one embodiment, is applicable to CMPs based on homogenous architecture, as well as to CMPs based on heterogeneous architecture.

Once the desired optimization has been achieved through grouping and duplication, the resulting aggregates may be mapped to appropriate processors on the chip. For example, aggregates containing critical functions (critical aggregates) may be assigned to faster processors while aggregates containing non-critical functions (non-critical aggregates) may be assigned to slower processors. In one embodiment, a critical path comprising critical functions is determined automatically based on the application's profile.

Figure 1:
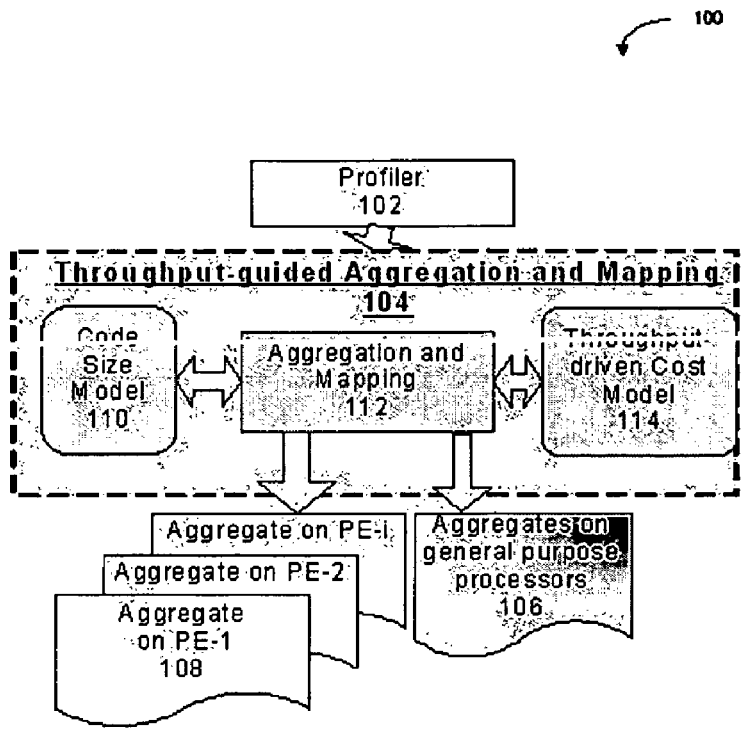
FIG. 1A is a diagrammatic representation of a throughput-driven aggregation and mapping framework, according to an embodiment of the invention.
FIG. 1B is a diagrammatic representation of an aggregation and mapping component, according to an embodiment of the invention.

FIG. 1A is a diagrammatic representation of a throughput-driven aggregation and mapping framework 100. The framework 100, which may be implemented within a compiler, comprises, in one embodiment, a profiler 102 and a throughput-guided aggregation and mapping (TGAM) phase 104. The TGAM 104 may be configured to partition an application by aggregating functions into tasks (or aggregates) and map tasks to processors on the chip.

In one embodiment, a packet-processing application may be written utilizing a data flow language. An illustrative dataflow language has actors called packet processing functions (PPFs) and inter-actor conduits called channels, and data appropriate for usage on channels called packets. Channels carry data, typically packets, between the output and input channel endpoints of PPFs. In such an application, each function can receive packets from input communication channels, process packets, and send packets to output communication channels. Tasks may be created by aggregating a set of functions. The tasks are then executed on various kinds and numbers of processors. A compiler may represent an entire packet processing application as a PPF graph, where each node represents a PPF and each edge represents a communication channel. A node in a PPF graph may be referred to as an intermediate representation (IR) node.

As shown in FIG. 1A, the TGAM phase 104 follows the profiler 102. The profiler 102, in one embodiment, provides runtime statistics (e.g. frequency of each packet processing function, utilization of communication channels, etc.). In the TGAM phase 104, multiple aggregates are generated and each aggregate is mapped to a suitable processor. The aggregates mapped to general purpose processors are illustrated by component 106; the aggregates mapped to PEs are illustrated by components 108. The TGAM phase 104 is followed by a phase (not shown) where different compiler code generators are invoked to generate binaries corresponding to the mapped aggregates. It will be noted that the TGAM phase 104 may be utilized within an interpreter as well as within a compiler.

Figure 1B:
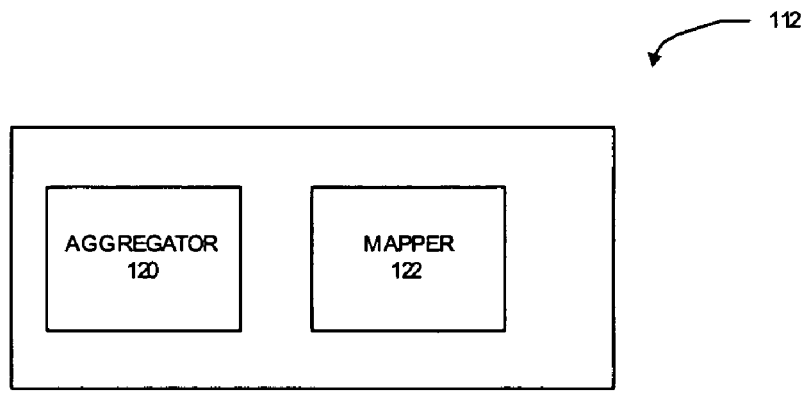

The TGAM phase 104, in one embodiment, comprises a code size model 110, a throughput-driven cost model 112, and an aggregation and mapping component 114. The aggregation and mapping component 114, in one embodiment, comprises an aggregator 120 and a mapper 122, as shown in FIG. 1B. The code size model 110 may be configured, in one embodiment, to estimate static code size for each aggregate and guide the aggregation and mapping component 114 to satisfy system constraints (e.g. limited code store size of a PE). The throughput-driven cost model 112, in one embodiment, models throughput as well as other factors that have a critical effect on throughput (e.g. communication cost, memory access latency, CPU execution time, and code size, and synchronization cost). The cost model 112 is used by the aggregation and mapping component 114 to improve system throughput. The aggregation and mapping component 114 is comprised of a heuristic algorithm for maximizing system throughput. Aggregation includes two possible actions that can be applied to aggregates: (1) grouping to combine two aggregates into one aggregate; and (2) duplication to increase the number of PEs executing an aggregate.

In order to estimate static code size (size of an aggregate), the following formula may be used:

$$\text{Size of aggregate} = \Sigma \text{Size}[\text{IR node of aggregate}] + \text{code size of library function calls}$$

In the size formula above, each library function call is calculated only once because the code size being estimated is static code size. Similarly, each library function call results in only one copy of the call in the code store of a PE. In one embodiment, the code size is adjusted during aggregation. For example, when two aggregates are combined, the code size of the resulting aggregate is recalculated.

The throughput-driven cost model 112 may be utilized to approximate the system throughput (e.g., packets/sec). Throughput may be expressed by the following formula:

$$T = (N/P) * K$$

In the above formula, K is the average throughput of the slowest aggregate among all of the aggregates in a given partition of the application. N is the number of available PEs, which is a constant in a given hardware configuration. P is the number of PEs required to execute the aggregate decomposition (e.g., the whole pipeline of aggregates).

If the number of available PEs is equal to or more than twice of the number of PEs required to execute a single aggregate in the application, then multiple copies of the packet processing pipeline may be created, which, in turn, may result in increased throughput of the system running the application. The number of copies of the packet processing pipeline may be expressed as a function of the ratio between the number of available PEs and the number of PEs required to execute a single aggregate (e.g., floor(N/P)). In a degenerated case, when the number of available PEs is equal to the number of PEs required to execute the whole pipeline of aggregates, the overall throughput is equal to the throughput of the slowest aggregate (i.e., K). From this model, it follows that in order to achieve the maximal overall throughput, the number of PEs required to execute the aggregate decomposition (P) needs to be minimized, while the throughput of the slowest aggregate (K) needs to be maximized. However, these two variables often compete with each other. In order to reduce P, more aggregates need to be grouped into one aggregate, which increases execution time of the resulting aggregate and therefore tends to reduce the throughput (K) of the resulting aggregate. On the other hand, in order to increase K (the throughput of an aggregate), an aggregate may be duplicated so that it is processed by two or more PEs. The throughput of an aggregate may also be increased by grouping fewer functions into the same aggregate. This approach to increasing the throughput of an aggregate, however, requires more PEs to hold all the aggregates and thus increases the value of P. Therefore, it is desirable that the aggregation and mapping component 112 attempts to achieve a balance between the minimal P and maximal K that results in the best system throughput.

The number of PEs required to execute the aggregate decomposition (P) may be determined by tracking the number of aggregates created. Factors that influence the throughput of the slowest aggregate (K) include the effect of multithreading on each PE, aggregate duplication, and various costs associated with the execution time of the slowest aggregate. Hence, K may be modeled as a function of the duplication factor for the current aggregate, the number of threads running on a PE, and the execution time of the current aggregate (H):

$$K = F(\text{duplication factor}, \# \text{ of threads}, H)$$

Duplication of the slowest aggregate can increase throughput of the slowest aggregate (K) because packets are being handled by more PEs. If the memory bandwidth of the CMP is not saturated, duplication can typically give a linear increase of the throuhout. Hence, in the model above, K is proportional to the duplication factor. Multiple threads running on each PE also affect K because it tends to hide memory access latency, communication cost, and synchronization cost. The accuracy of the above model may depend on the ratio between computation cost and other costs. In one embodiment, the performance benefit of multiple threads is approximated optimistically so that K is represented as proportional to the number of threads per PE.

Excluding the considerations of duplication and multiple threads, H represents cost or execution time for the slowest aggregate. Some of the components for calculating the execution time of an aggregate may include computation cost, communication cost, memory access cost, and synchronization cost.

The computation cost depends on the execution frequency (Freq) for each computation node (e.g., for each PPF), as well as the latency for executing each instruction. The memory access cost depends on the frequency of memory accesses, the size of data accesses, and the latency for accessing a specific memory level. The communication cost can be derived from the execution frequency, the amount of data transferred on each channel, and the communication latency. When two aggregates are grouped into one, the communication cost is reduced since packets can typically be transferred more efficiently within the same PE. Synchronization cost, in one embodiment, depends mostly on the maximal cost among all locks associated with various threads running on a processing element. Thus, synchronization cost is introduced by combining the critical section overheads and the cost of acquiring and releasing each lock. Synchronization cost also depends on the number of threads involved. Hence, when an aggregate is duplicated, the synchronization cost has to be recalculated because the number of threads involved is increased. In summary, throughput (T) may be represented as follows:

$$T = ((N/P) * \text{duplication factor} * \text{\# of threads})/H, \text{ wherein:}$$

$$H = \text{computation cost } (PC) + \text{memory access cost } (MC) +$$
$$\text{communication cost } (CC) + \text{synchronization cost } (SC);$$

$$PC = \sum_{\text{All the computation nodes}} Freq * \text{node\_latency};$$

$$MC = \sum_{\text{All the memory accesses}} Freq *$$
$$\text{memory\_access\_latency} * (\text{data}/\text{data\_unit});$$

$$CC = \sum_{\text{All the communication nodes}} Freq * \text{communication\_latency}*$$
$$(\text{transfer\_data}/\text{data\_unit}); \text{ and}$$

$$SC = \max_{\text{For each lock node}} (Freq * \text{Cost of (acquire + release +}$$
$$\text{critical\_section}) * \text{\# of threads involved}).$$

Figure 2:
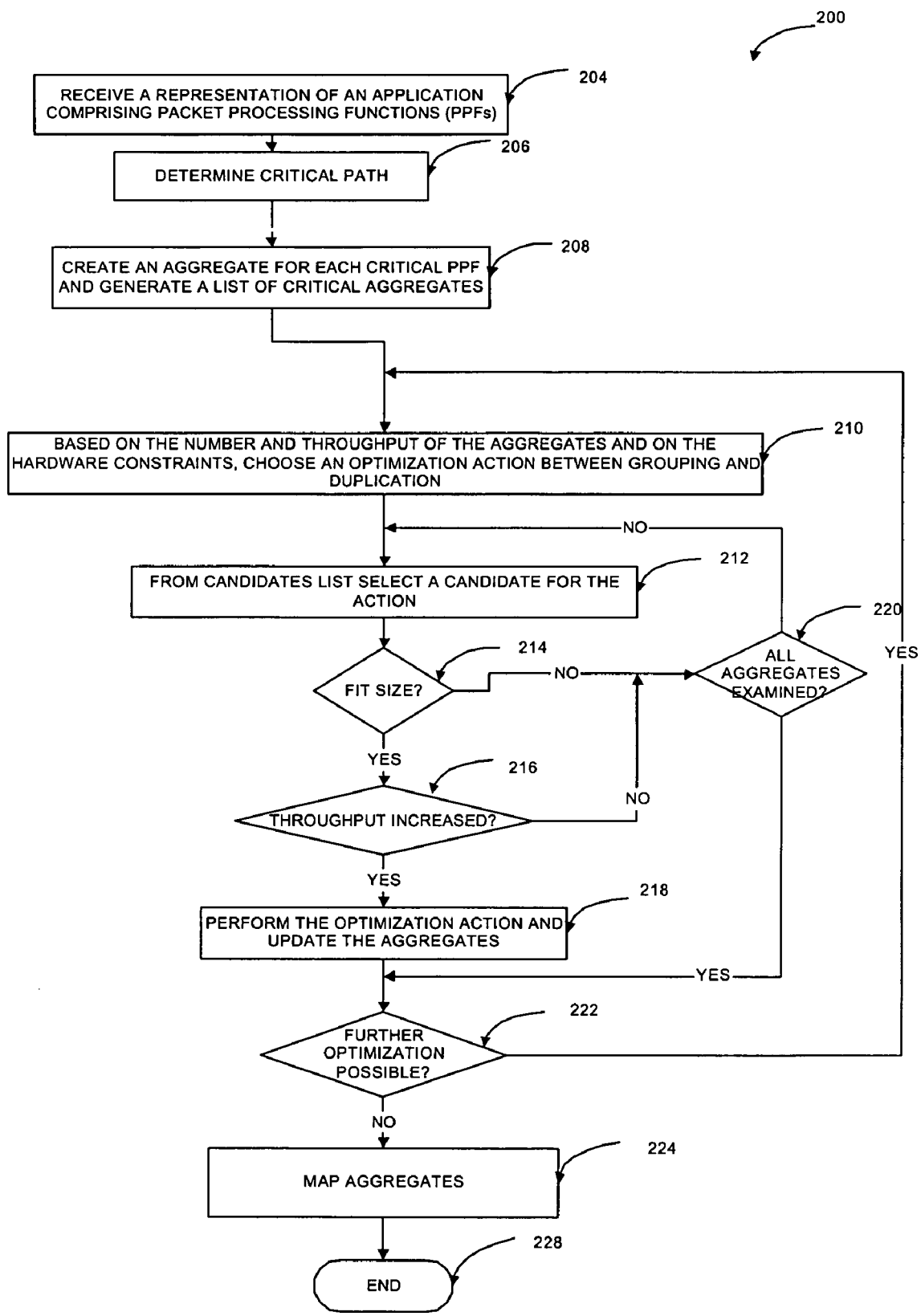
FIG. 2 is a flow chart of a method for partitioning an application utilizing a throughput-driven aggregation and mapping approach, according to an embodiment of the invention.

FIG. 2 is a flow chart of a method 200 for partitioning an application utilizing a throughput-driven aggregation and mapping approach. The method 200 may be performed by processing logic that may comprise hardware (e.g., dedicated logic, programmable logic, microcode, etc.), software (which runs on a general purpose computer system or a dedicated machine), or a combination of both.

Referring to FIG. 2, at operation 204, a representation of a packet-processing application is received at the profiler 102. The profiler examines the application and generates statistical information regarding the application, such as the locality properties of data structures, frequencies of executions for different PPFs, and the amount of communication between each pair of PPFs. The aggregation and mapping component 112 utilizes the statistics provided by the profiler 102 to determine critical path for the application, at operation 206. A critical path is a vital code path that should be optimized for the common case. In one embodiment a PPF in the critical path is considered a critical PPF.

At operation 208, a separate aggregate is created for each packet processing function (PPF) of the application at operation 208. Also at operation 208, a list of all aggregates that correspond to critical PPFs (so called critical aggregates) may be generated. This list may be utilized as a list of candidates for further optimization.

At operation 210, an optimization action is selected between grouping and duplication based on the number of aggregates, available PEs, and execution time of each aggregate. The choice between grouping and duplication is made to balance the execution time of each pipeline stage while using the smallest possible number of PEs in the pipeline.

According to the selected optimization action, the best candidate is selected from the list of candidates at operation 212. In one embodiment, a candidate comprises two different aggregates when the optimization action is grouping and one aggregate when the optimization action is duplication. Selection of the best candidate may be performed based on various factors, such as communication cost between aggregates and the execution time for each aggregate. The details of selecting a candidate will be discussed with reference to FIG. 3.

In order for a candidate to be accepted for an optimization action, the candidate may undergo two additional checks. The first check determines hardware constraints at operation 214, (e.g. whether the code size fits within the code store limit of a PE). The second check determines, at operation 216, whether the performance improves when the optimization action is applied to the candidate (e.g. whether the throughput increases or not). If either of the two checks fails, the optimization action is aborted and the list of aggregates is examined for another candidate. The algorithm iterates until all the critical aggregates are examined (operation 220). In one embodiment, the two checks in the algorithm are implemented using the above code size formula and throughput formula.

If the tests of operations 214 and 216 both pass, the optimization action is committed at operation 218 and the aggregates are updated accordingly. Once the aggregates are updated, the list of critical aggregates is rebuilt.

If it is determined, at operation 222, that no further optimization is possible, the final aggregates are mapped to heterogeneous processors on the CMP, at operation 224, with critical aggregates running on PEs and non-critical aggregates running on the general purpose processor. The details of mapping the aggregates to processors on the CMP will be discussed with reference to FIG. 4. The method 200 ends at operation 226.

It will be noted, that optimization operations of the method 200 may be applied to any subset of functions in a packet-processing application, which may not necessarily correspond to a critical path. These optimization operations may also be applied to all packet processing functions of an application.

Figure 3:
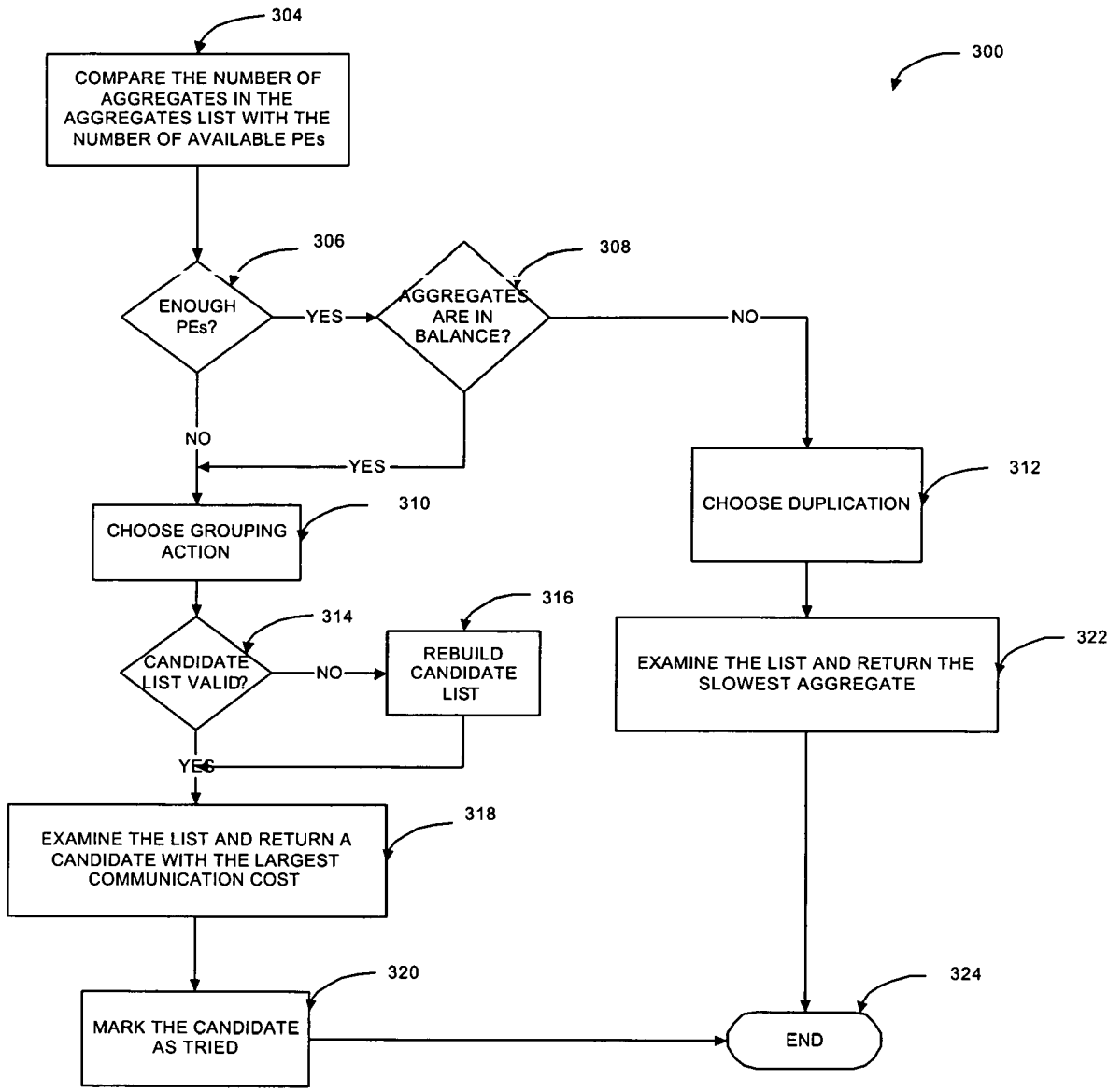
FIG. 3 is a flow chart of a method 300 for selecting a candidate for a chosen optimization action, according to one embodiment of the invention.

FIG. 3 is a flow chart of a method 300 for selecting a candidate for a chosen optimization action. The operations of the method 300 correspond, in one embodiment, to operations 210 and 212 of FIG. 2. The method 300 may be performed by processing logic that may comprise hardware (e.g., dedicated logic, programmable logic, microcode, etc.), software (which runs on a general purpose computer system or a dedicated machine), or a combination of both.

Referring to FIG. 3, at operation 304, the number of aggregates in the aggregate list is compared with the number of available PEs. Grouping action is selected if there are more aggregates in the list than there are available PEs, or if there are enough PEs, but the aggregates in the list are not in balance (operations 306-310). The aggregates are considered to not be in balance if some aggregates in the list are particularly slow such that duplication of the aggregate may be appropriate, while other aggregates have high throughput such that grouping may be warranted. Duplication action is selected at operation 312 if the number of aggregates in the list is less than or equal to the number of available PEs and if the aggregates in the list are in balance.

If the grouping action is selected at operation 310, the list is verified for validity at operation 314, rebuilt if determined to be invalid (operation 316), and examined to identify an appropriate candidate for grouping at operation 318. An appropriate candidate, in one embodiment, is a pair of aggregates from a list sorted by decreasing communication cost for the channels connecting each aggregate pair. An appropriate candidate for grouping, in one embodiment, is determined by utilizing the communication cost computed in the throughput formula. The communication cost is computed for reducible channels associated with the candidate. Reducible channels are channels that can be replaced by direct function calls in order to reduce the communication cost. The method 300 identifies a new candidate channel with the largest communication cost so that a larger communication cost may be reduced after grouping the two aggregates at the two ends of the channel. The candidate is then marked as "tried" at operation 320.

When duplication operation is selected at operation 312, the slowest aggregate with the longest execution time is selected from the list of aggregates, at operation 322, so that the slowest aggregate is executed by two or more PEs. The method 300 ends at operation 324.

Figure 4:
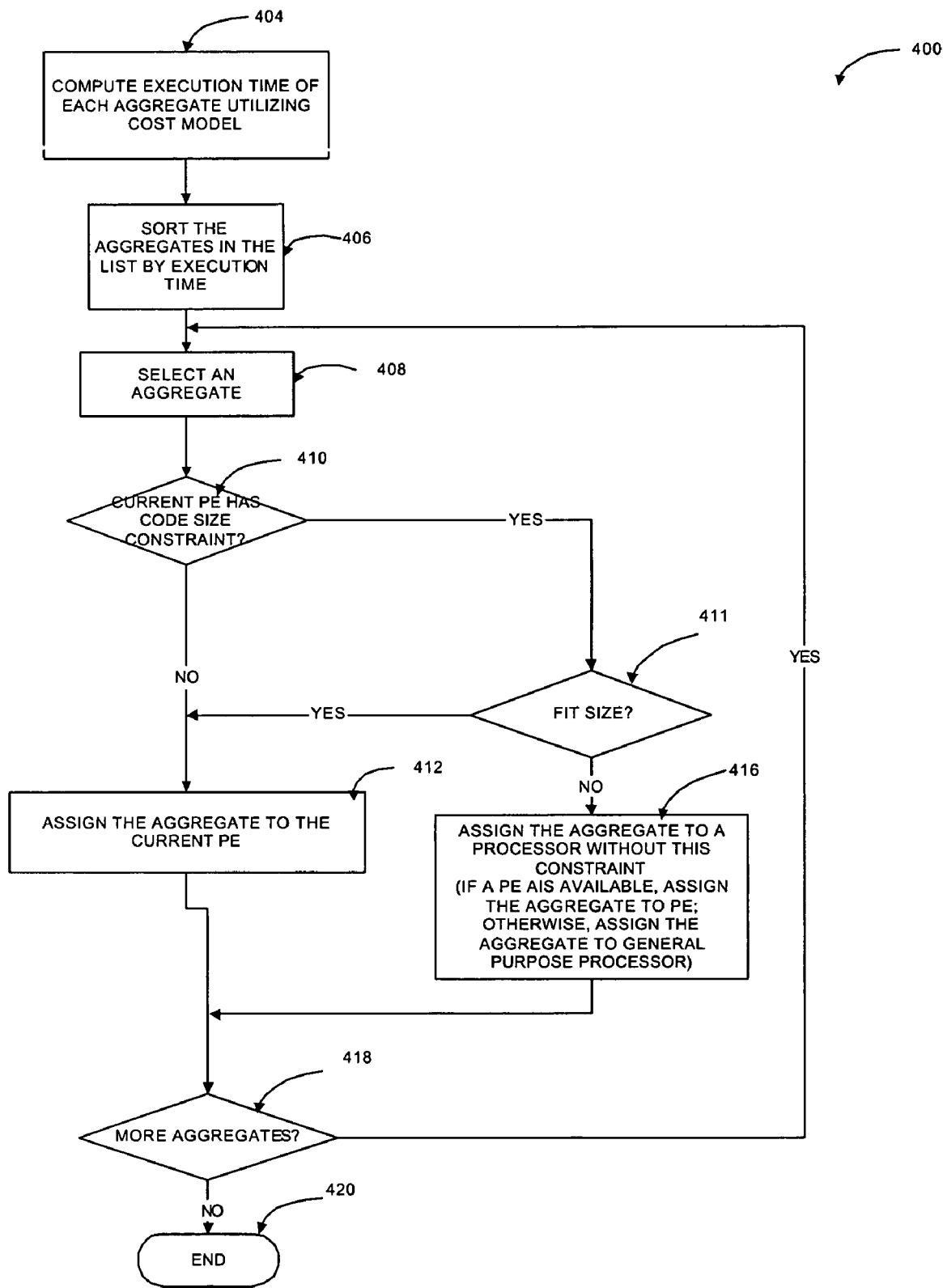
FIG. 4 is a flow chart of a method 400 for mapping aggregates to heterogeneous processors, according to one embodiment of the invention.

FIG. 4 is a flow chart of a method 400 for mapping aggregates to heterogeneous processors. The operations of the method 400 correspond, in one embodiment, to operation 224 of FIG. 2. The method 400 may be performed by processing logic that may comprise hardware (e.g., dedicated logic, programmable logic, microcode, etc.), software (which runs on a general purpose computer system or a dedicated machine), or a combination of both.

Referring to FIG. 4, at operation 404, execution time of each aggregate is computed and the aggregates are sorted by their respective execution times at operation 406. In one embodiment, execution time of an aggregate is computed utilizing the cost model (H) described above. Then, for each aggregate, the mapping component of the compiler determines whether the current PE has a code size constraint and whether the code size of the current aggregate satisfies the current PE's code size constraint (operations 410 and 411). If the current PE has a code size constraint and the code size of the current aggregate does not satisfy the current PE's code size constraint, another processor is selected that does not have this constraint (operation 416). An aggregate may need to be assigned to more than one PE, depending on the duplication number for the aggregate, which may be determined during the process of optimizing the partitioning of the PPFs into aggregates. If enough PEs are available for the current aggregate, the current aggregate is assigned to such PEs. If the code size of the current aggregate satisfies the current PE's code size constraint or if the current PE does not have a code size constraint, the current aggregate is mapped the current PE (operation 412). Thus, more critical aggregates may be mapped to faster PEs, while less critical aggregates may be mapped to slower general purpose processors. The method 400 ends at operation 420.

Figure 5:
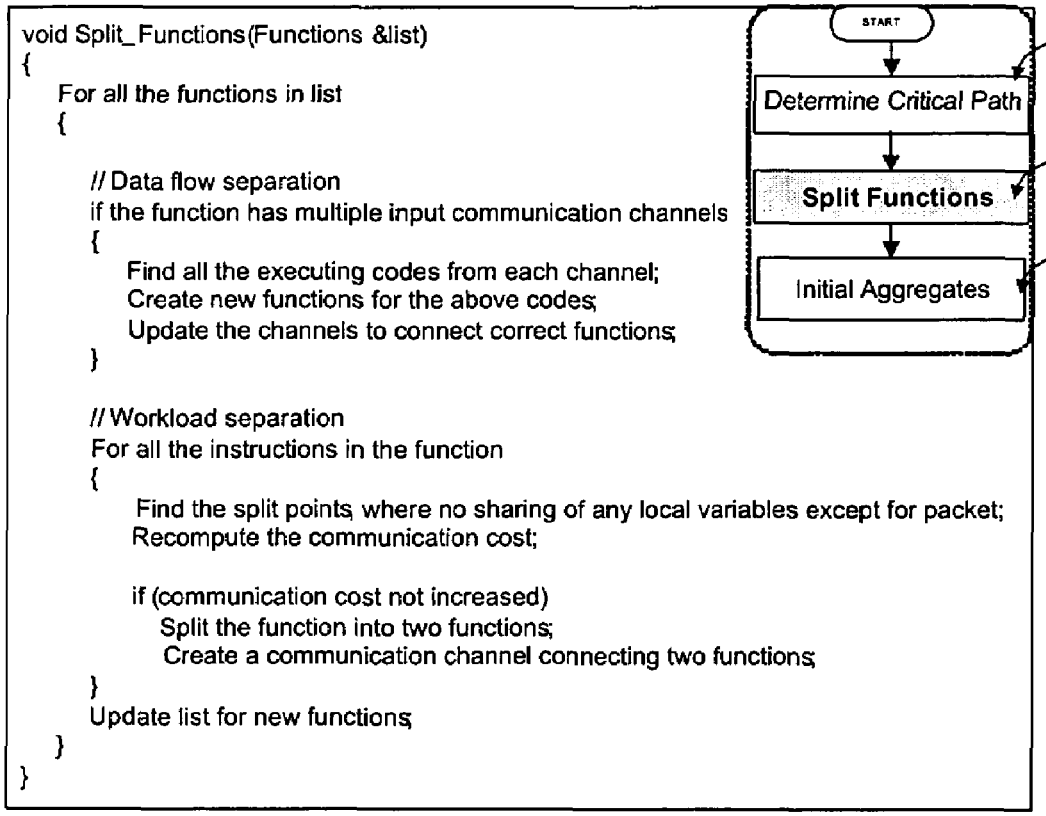
FIG. 5 shows an illustrative pseudo code for a function splitting extension, according to one embodiment of the invention.

FIG. 5 shows an illustrative pseudo code for a function splitting extension, according to one embodiment of the invention. A function splitting extension may be beneficial where a packet processing application includes large decomposable functions. For example, a function in an application may have mixed codes for processing packets from different input channels, where one path is critical and the other path is non-critical. Furthermore, if one critical function is too big to fit into a PE, it will be mapped to a general purpose processor, according to one embodiment of the invention. Thus, there may be a situation where the performance requirements conflict with programming flexibility. A function splitting extension may be utilized in order to solve this conflict. In one embodiment, a "split functions" operation 504 may be inserted between operation 502 (determine critical path) and operation 506 (initialize aggregates). As shown in FIG. 5, this extension can separate functions utilizing two approaches: (1) data flow separation to separate codes for different data flows; and (2) workload separation to balance workload of each function without introducing any significant communication and memory access cost. It will be noted, that function splitting is not performed when it interferes with shared packet accesses or introduces more dynamic packet accesses after splitting.

Figure 6:
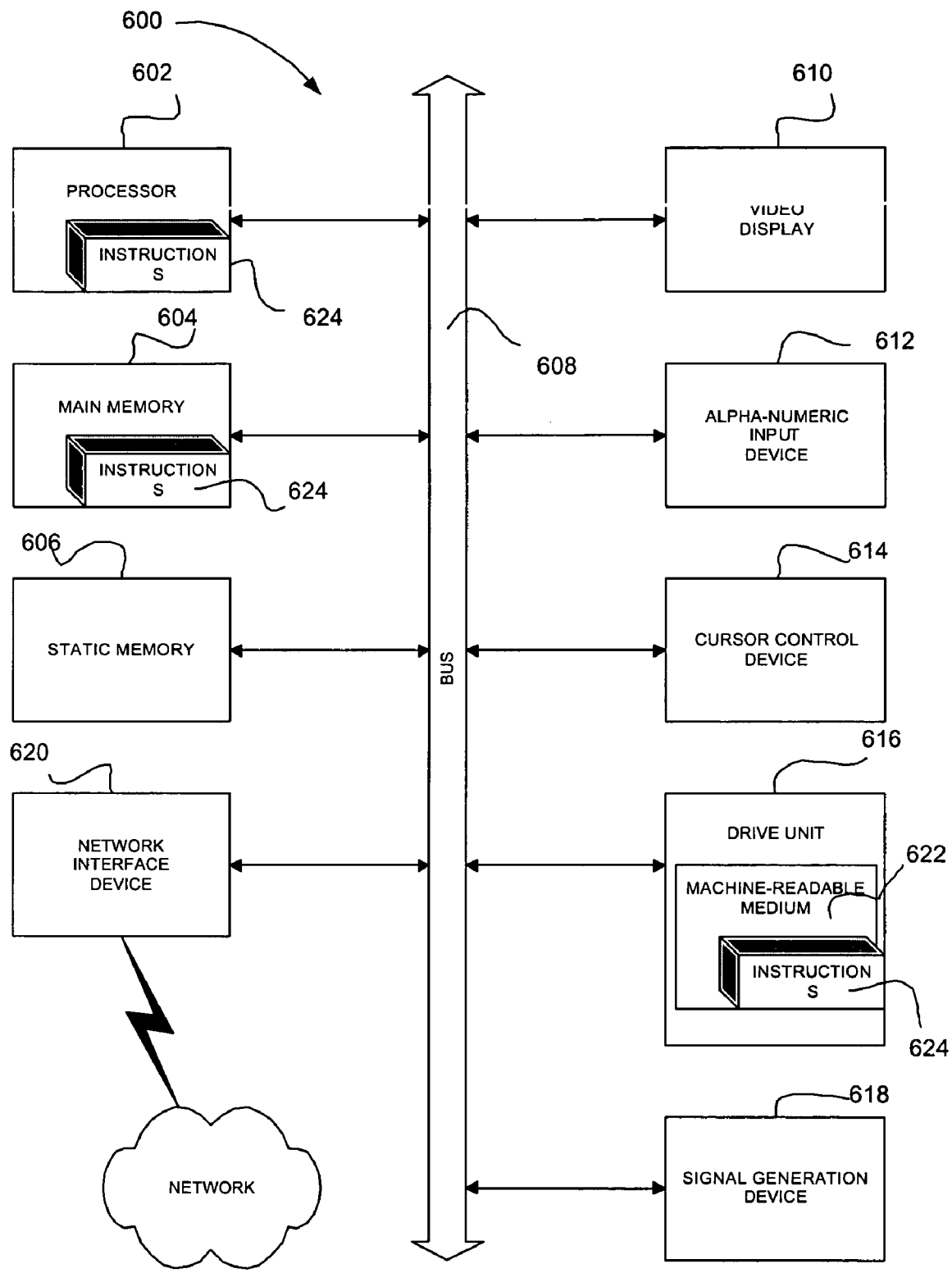
FIG. 6 is a diagrammatic representation of a computer system, within which a set of instructions, for causing the machine to perform any one or more of the methodologies discussed herein, may be executed.

FIG. 6 shows a diagrammatic representation of machine in the exemplary form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable storage medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable storage media.

The software 624 may further be transmitted or received over a network 626 via the network interface device 620.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the invention. The term "machine-readable medium" shall accordingly be taken to include but not be limited to, storage media such as solid-state memories, optical and magnetic media, and communication media such as carrier wave signals.

Thus, a method and system for partitioning an application utilizing a throughput-driven aggregation and mapping approach have been described. Although the method and the system have been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The invention claimed is:

1. A computer-implemented method to optimize throughput of executable program code, the method comprising;
    receiving a plurality of functions;
    creating a plurality of aggregates, the plurality, of aggregates to include an aggregate for each of the plurality of functions;
    determining a slowest aggregate from the plurality of aggregates;
    calculating an average throughput of the slowest aggregate from the plurality of aggregates, wherein calculating the average throughput of the slowest aggregate includes
        multiplying a duplication factor for a current aggregate from the plurality of aggregates by a number of threads running on a current processing element, and
        dividing the result of the multiplying by a maximal execution cost of all aggregates from the plurality of aggregates;
    choosing an optimization action between a grouping action and a duplication action based on the number of aggregates in the plurality of aggregates, the number of available processing elements (PEs), execution time of each aggregate, and the average throughput of the slowest aggregate;
    performing the chosen optimization action; and
    mapping the plurality of aggregates to a plurality of processors.

2. The method of claim 1, wherein the maximal execution cost for all aggregates is a sum of at least two or more of computation cost, memory access cost, communication cost, and synchronization cost.

3. The method of claim 1, wherein the functions are packet processing functions.

4. The method of claim 1, further comprising;
    responsive to choosing the grouping action, selecting a pair of aggregates with the largest communication costs from the plurality of aggregates; and
    grouping the pair of aggregates.

5. The method of claim 1, further comprising:
    responsive to choosing the duplication action, selecting an aggregate with the lowest throughput from the plurality of aggregates; and
    duplicating the aggregate.

6. The method of claim 1, wherein the method further includes determining critical and non-critical functions from the plurality of functions.

7. The method of claim 6, wherein mapping the aggregates to a plurality of processors comprises:
    mapping aggregates comprising critical functions to processing elements; and
    mapping aggregates comprising non-critical functions to a general purpose processor.

8. The method of claim 1, further comprising:
    identifying a function appropriate for splitting; and
    splitting the identified function into two or more functions.

9. A compiler stored on a machine-readable storage medium comprising:
    a profiler to receive a representation of a plurality of functions;
    an aggregator to:
        create an aggregate for each function from the plurality of functions thereby creating a plurality of aggregates,
        choose an optimization action between a grouping action and a duplication action based on the number of aggregates in the plurality of aggregates, the number of available processing elements (PEs), execution time of each aggregate, and an average throughput of the slowest aggregate, and
        perform the chosen optimization action;
    a cost model to determine the average throughput of the slowest aggregate from the plurality, of aggregates by multiplying a duplication factor for a current aggregate from the plurality of aggregates by a number of threads running on a current processing element divided by the maximal execution cost for all aggregates from the plurality of aggregates; and
    a mapper to map the plurality of aggregates to a plurality of processors.

10. The compiler of claim 9, wherein the maximal execution cost for all aggregates is a sum of at least two or more of computation cost, memory access cost, communication cost, and synchronization cost.

11. The compiler of claim 9, wherein functions from the plurality of functions are packet-processing functions.

12. The compiler of claim 9, wherein the aggregator is further to:
    responsive to choosing the grouping action, select a pair of aggregates with the largest communication costs from the plurality of aggregates; and
    group the pair of aggregates.

13. The compiler of claim 9, wherein the aggregator is further to:
    responsive to choosing the duplication action, select an aggregate with the lowest throughput from the plurality of aggregates; and
    duplicate the aggregate.

14. The compiler of claim 9, wherein the aggregator is further to determine critical and non-critical functions from the plurality of functions.

15. The compiler of claim 14, wherein the mapper is further to:
    map aggregates comprising critical functions to processing elements; and
    map aggregates comprising non-critical functions to a general purpose processor.

16. The compiler of claim 9, wherein the aggregator is further to identify a function appropriate for splitting and split the identified function into two or more functions.

17. The compiler of claim 9, wherein the plurality of processors are heterogeneous processors.

18. A machine-readable storage medium having stored thereon data representing sets of instructions which, when executed by a machine, cause the machine to:
- receive a plurality of functions;
- create a plurality of aggregates, the plurality, of aggregates to include an aggregate for each of the plurality of functions;
- determine a slowest aggregate from the plurality of aggregates;
- calculate an average throughput of the slowest aggregate from the plurality of aggregates, wherein calculating the average throughput of the slowest aggregate includes
  - multiplying a duplication factor for a current aggregate from the plurality of aggregates by a number of threads running on a current processing element, and
  - dividing the result of the multiplying by a maximal execution cost of all aggregates from the plurality of aggregates;
- choose an optimization action between a grouping action and a duplication action based on the number of aggregates in the plurality of aggregates, the number of available processing elements (PEs), execution time of each aggregate, and the average throughput of the slowest aggregate;
- perform the chosen optimization action; and
- map the plurality of aggregates to a plurality of processors.

19. The machine-readable storage medium of claim 18, wherein the sets of instructions further cause the machine to:
- responsive to choosing the grouping action, select a pair of aggregates with the largest communication costs from the plurality of aggregates, and group the pair of aggregates; and
- responsive to choosing the duplication action, select an aggregate with the lowest throughput from the plurality of aggregates, and duplicate the aggregate.

* * * * *